United States Patent
Furman et al.

(10) Patent No.: US 9,529,703 B2
(45) Date of Patent: Dec. 27, 2016

(54) PERFORMING DYNAMIC DATA GENERATION AND VERIFICATION FOR FUNCTIONAL VALIDATION OF DATA MANIPULATION PROGRAMS

(71) Applicant: International Business Machines Corporation, Armonk, NY (US)

(72) Inventors: Deborah A. Furman, Staatsburg, NY (US); Anthony T. Sofia, Highland, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/603,912

(22) Filed: Jan. 23, 2015

(65) Prior Publication Data
US 2016/0217063 A1    Jul. 28, 2016

(51) Int. Cl.
G06F 9/44    (2006.01)
G06F 11/36    (2006.01)

(52) U.S. Cl.
CPC ............. *G06F 11/3688* (2013.01); *G06F 8/70* (2013.01)

(58) Field of Classification Search
None
See application file for complete search history.

(56) References Cited

U.S. PATENT DOCUMENTS 8,453,115 B2 *   5/2013   Murray et al. ...... G06F 11/3672
                                                        717/124

* cited by examiner

*Primary Examiner* — Qamrun Nahar
(74) *Attorney, Agent, or Firm* — Cantor Colburn LLP; William A. Kinnaman, Jr.

(57) ABSTRACT

A system and method for generating a file that includes a name that hashes directly to a request block is provided. The request block includes instructions describing how to generate or validate data corresponding to the request block. The system and method can further for a data manipulation program that executes in accordance with instructions of the request block.

13 Claims, 6 Drawing Sheets

PERFORMING DYNAMIC DATA GENERATION AND VERIFICATION FOR FUNCTIONAL VALIDATION OF DATA MANIPULATION PROGRAMS

BACKGROUND

The present disclosure relates generally to generating and verifying data for testing data manipulation programs, and more specifically, to performing verification of data manipulation programs by dynamically defining the type of input data and the type of validation that should be performed.

Testing a program that reads an input file and produces an output file requires disk space to satisfy both ends of the request. This can become very costly based on the required sizes of the input and output files and the number of test data patterns that are to be run. While large amount of disk space may be available on some testing systems it is likely that a majority of test systems will lack the physical disk resources to run tests with large inputs and output files as well as archival of the input files and output files for regression testing and verification.

This situation is again made worse when testing multiple invocations of the program in parallel. All of the data needs to be online for all instances. In the case where all instances will use a single input we may have to have multiple copies of that input file and there will certainly be multiple copies of the output file, again wasting online storage.

SUMMARY

Embodiments include a method, system, and computer program product for generating a file, by a test program, that includes a name that hashes directly to a request block, the request block including instructions describing how to generate or validate data corresponding to the request block; a data manipulation program, the data manipulation program configured to receive the name of the file as an input; and executing a routine, by the operating system, in accordance with instructions of the request block, the data manipulation program utilizing the input to access the instructions that govern the routine.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
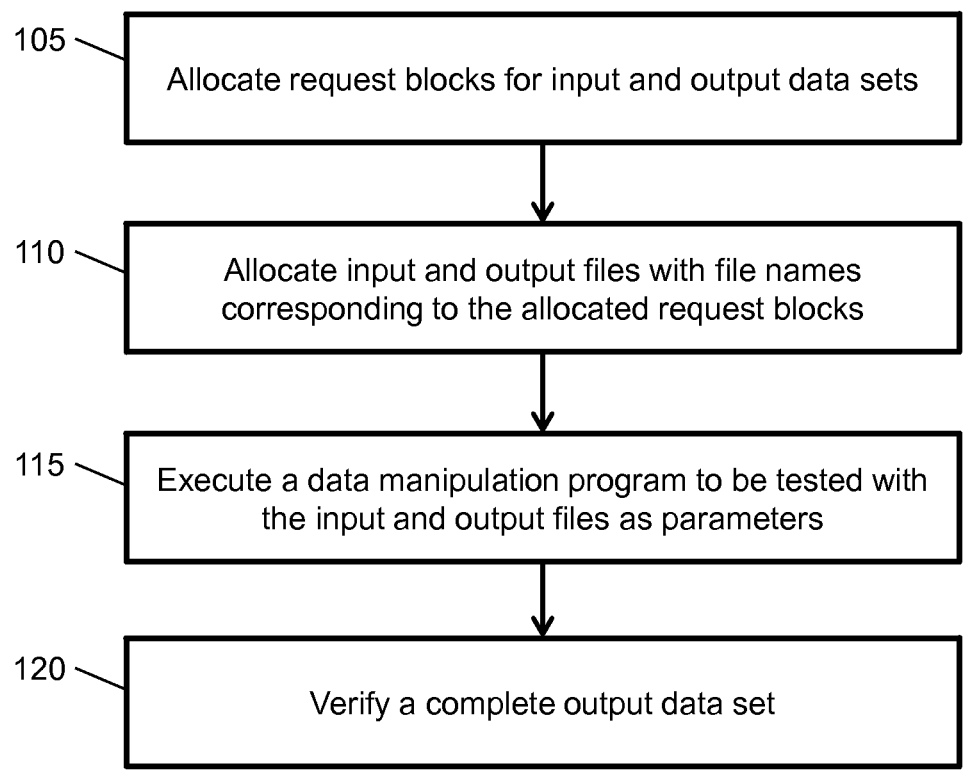
FIG. 1 depicts a process flow of a method executing a test program that supports testing of a data manipulation program, in accordance with an embodiment.

Embodiments described herein relate to the need to test programs of a system that can take in large amounts of data by storing for verification input, intermediate, and/or output copies of that data. Accordingly, as an amount of the data taken into the programs grows when executing testing, there needs to be three times the available storage for the data. Thus, embodiments herein provide for the dynamic generation and validation of data to avoid or circumvent storing input, intermediate, and/or output copies of that data.

In one embodiment, virtual files are dynamically created for input and output data of a data manipulation program by a test program that defines the virtual files and builds request blocks. The request block for each virtual file describes how the corresponding data should be generated and validated during input to and output from the data manipulation program. In this way, each request block acts as an identifier of each virtual file, such that when the data manipulation program that is being tested runs, the data manipulation program can perform a request to that file and run a routine to utilize a file name that represent the request block to get and/or verify the corresponding data.

Further, with respect to a plurality of request blocks being created for a plurality of virtual files, the plurality of request blocks are built in concert with each other so that as the data is output by the data manipulation program it is verified with the corresponding data that was input to the data manipulation program to confirm that the data manipulation itself was correct. Thus, by utilizing the plurality of virtual files, the data manipulation program circumvents storing input and/or output copies of the data for generation and validation. Note that intermediate files may still need online storage (for example, sorting a data set that is larger than available memory may still require a sort program to store that data in intermediate files).

In operation, a system creates a programmatically generated file for testing, names the file such that a test program can attach another program to test with the file name as input (e.g., the test program could execute the another program through any mechanism, such as in-line with the test program, forked as an independent task, a service in a cloud environment, etc.). Then, the system finds that request block by hashing the file name directly to a request block that tells a data generation routine how to build data. This process can be repeated for writing and verification of data.

Note that because the system does not have any additional test case involvement during the execution of the program, which allows the program to use the unaltered system primitives for reading data. Also, by using system primitives, the test program can overload the read and write primitives for a set of files (i.e. a file system or data class) such that the code that runs interrogates the request block and generates or verifies data. As the data is generated or verified it is discarded and not written to disk or kept in memory. For example, in the z/OS operating system, the above can be accomplished using the sub-system interface, such that data sets can be provided to programs that utilize the test program created subsystem. This allows the primitive read and write functions to be used by a data manipulation program.

Turning now to FIG. 1, a process flow 100 is generally shown in accordance with an embodiment. The process flow 100 is an example of a executing a test program that supports a testing of a data manipulation program. The test program, generally, selects or generates a complete input data set; executes the program to be tested with the input file and output file as parameters; and verifies the complete output data set.

To select or generate the complete input data set, the test program allocates request blocks for input and output data sets. This request block describes the manner in which data must be generated and verified. Request blocks may include directions/instructions with respect to read and/or write operations. The access of the request block can also be completely transparent to the test program. Next, at block 110, that test program allocates input and output files with file names corresponding to the allocated request blocks (or via some other one to one mapping).

For example, a system creates a name a file, such that a test program could find a request block, and the name would be a direct hash to a location in memory that would hold the request block to help define the generation and validation without having any addition modifications to the code you are trying to request, such as scaffolding code or other hook. Note that, if the system of the data manipulation program to be tested does not require pre-allocation of files, then this action may be skipped.

With the complete input data set selected or generated, the test program, at block 115, executes the data manipulation program to be tested with the input and output files as parameters. For example, the test program calls the data manipulation program to be tested with the generated files names based on the corresponding request blocks.

After the data manipulation program finishes, the test program verifies the complete output data set, at block 120. That is, the test program confirms the verification using information in the output file request block. In this way, there is a logical link between the input and output files and the memory that contains the request block.

Figure 2:
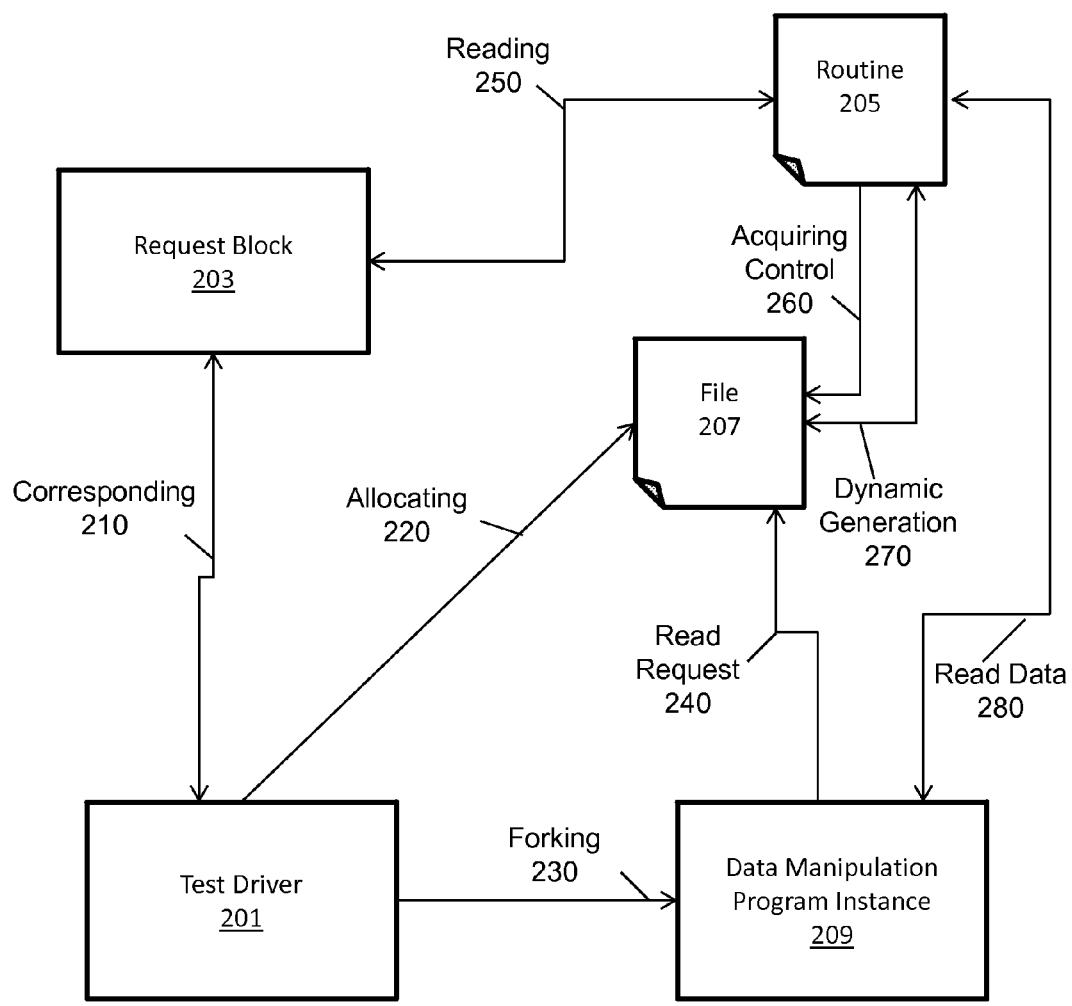
FIG. 2 depicts a schematic diagram of a system for dynamically generating data in accordance with an embodiment.

Turning to FIG. 2, a system 200 for dynamically (e.g., in real time) generating (e.g., during a reading process) and verifying (e.g., during a writing process) data that includes a test driver 201, a request block 203, a routine 205, an file 207 (e.g., an input file), and a data manipulation program instance 209, another process flow 200 in accordance with an embodiment.

To dynamically generate data during a read operation, the test driver 201 realizes data corresponding 220 to the request block 203. Then, the test driver 201 allocates 220 the input file 203 corresponding to the request block 203. This is due to the input file 203, which is the real-time generated data, including a file name based on an address of the request block 203.

The test driver 201 further forks 230 out the data manipulation program instance 209, as a new process or attached directly. In this way, anytime a read request 240 comes in from the data manipulation program instance 209, the routine 205 (e.g., an input file read routine) would get acquire control 260 of the file 207. The routine 205 then hashes the filed name of the file 207, so as to read 250 the directions of the request block 203. Then, the routine 205 dynamically generates 270 the data in accordance with the directions of the request block 203 and supplies through a read data operation 2870 the dynamically generated data to the data manipulation program instance 209.

Figure 3:
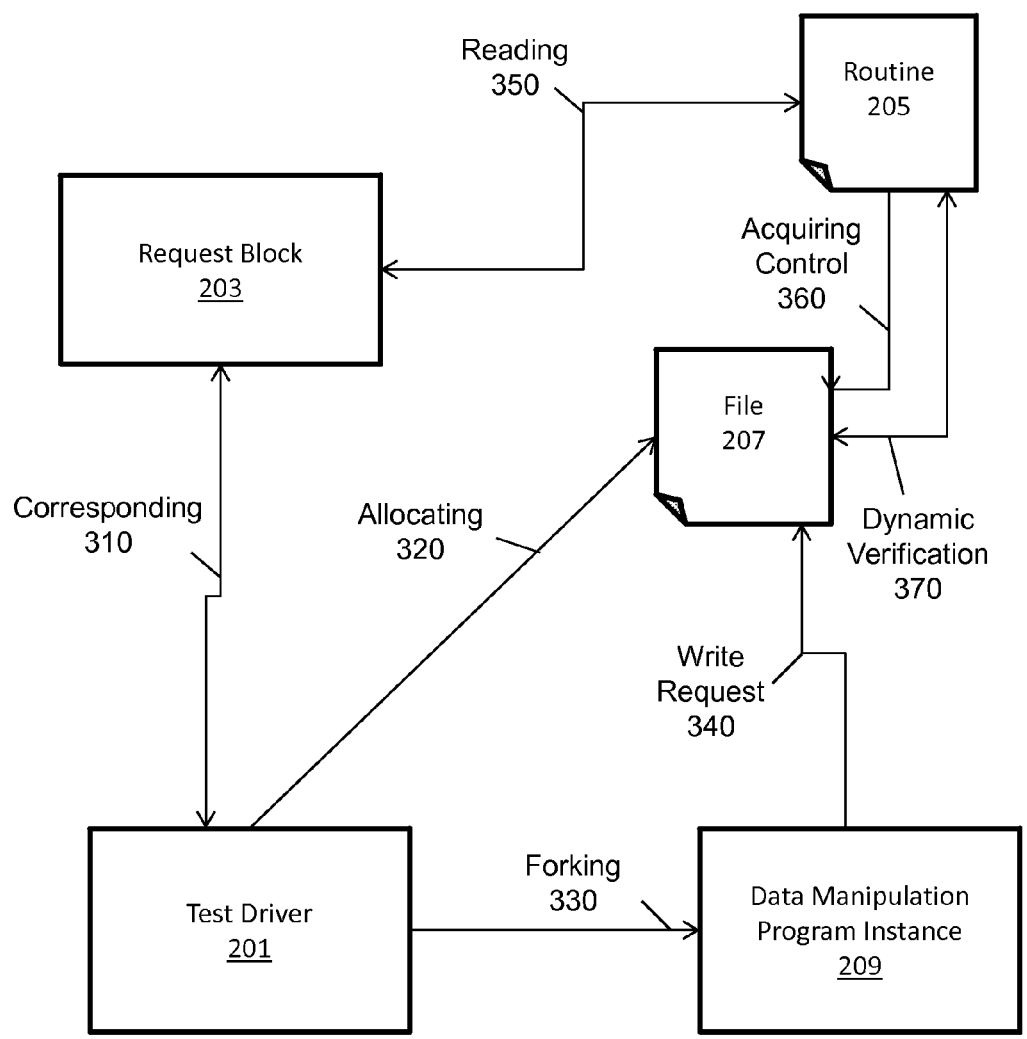
FIG. 3 depicts a schematic diagram of a system for dynamically verifying data in accordance with another embodiment.

Turning to FIG. 3, a dynamic validation process of the system 200 is during the writing process, which is symmetrical to the reading process. That is, the test driver 201 utilizes generally the same virtual file and request block method to provide verification as data is written. For instance, the test driver 201 realizes data corresponding 320 to the request block 203 and allocates 320 the input file 203 corresponding to the request block 203. The test driver 201 further forks 330 out the data manipulation program instance 209, such that anytime a read request 340 comes in from the data manipulation program instance 209, the routine 205 (e.g., output file write routine) would get acquire control 360 of the file 207 (e.g., an output file). The routine 205 then hashes the filed name of the file 207, so as to read 350 the directions of the request block 203. Then, the routine 205 dynamically validates 370 the data in accordance with the directions of the request block 203.

In view of the above, a usage example of these embodiments is to verify that a compression program does not corrupt data. For instance, a read request block can dictate a size and distribution of data to be built (e.g., random, patterned, alpha-numeric) and as the data is created for a read request that data can have a checksum maintained and recorded in the read request block.

Further, a write request block can then be responsible for verifying the compressed output by decompressing the data and again calculating a checksum, discarding the data as it is written. In turn, once the data manipulation program has completed execution, the test driver would then be able to compare the checksum from the read and write request clocks to determine whether the data is not corrupted.

The read and write routines can be extended with corresponding request block changes to also verify that for a given input data pattern (Read) that a certain compression ratio was achieved (Write). This extension could be developed without impacting the system.

In another embodiment, if multiple data manipulation programs of a system are accessing the same set of data, each data manipulation program independently accesses corresponding request blocks by hashing file names of virtual files corresponding to the data. Then, each data manipulation program separately executes directions/instruction of the request blocks to dynamically generate the data. For example, four data manipulation programs can dynamically execute four separate data generation routines based on independently hashing the same file name and independently operating a distinct copies of the same request block. In this way, the data itself is reentrant with only one copy existing in memory and each data manipulation program avoids storing copies of the data as it is input by each of the data manipulation files, thereby avoiding multiple copies of the data across the system.

Further, as the multiple data manipulation programs are outputting the data, each data manipulation program again independently accesses the corresponding request blocks by hashing the file names of the virtual files corresponding to the data. Then, each data manipulation program separately executes the directions/instruction of the request blocks to dynamically validate the data. Similarly to the above, each data manipulation program avoids storing copies of the data as it is output by each of the data manipulation files.

The present invention may be a system (e.g., implemented on a cloud computing environment), a method, and/or a computer program product. Further, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The computer program product may include a computer readable storage medium (or media) having computer readable program instructions thereon for causing a processor to carry out aspects and/or embodiments of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With respect to implementing aspect and/or embodiments of the present invention on cloud computing environment, cloud computing in general is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics can be on-demand self-service; broad network access; resource pooling; rapid elasticity; and measured service.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Three service models can include Software as a Service (SaaS); Platform as a Service (PaaS); and Infrastructure as a Service (IaaS).

SaaS: the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

PaaS: the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

IaaS: the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models can include private cloud; community cloud, public cloud; and hybrid cloud.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
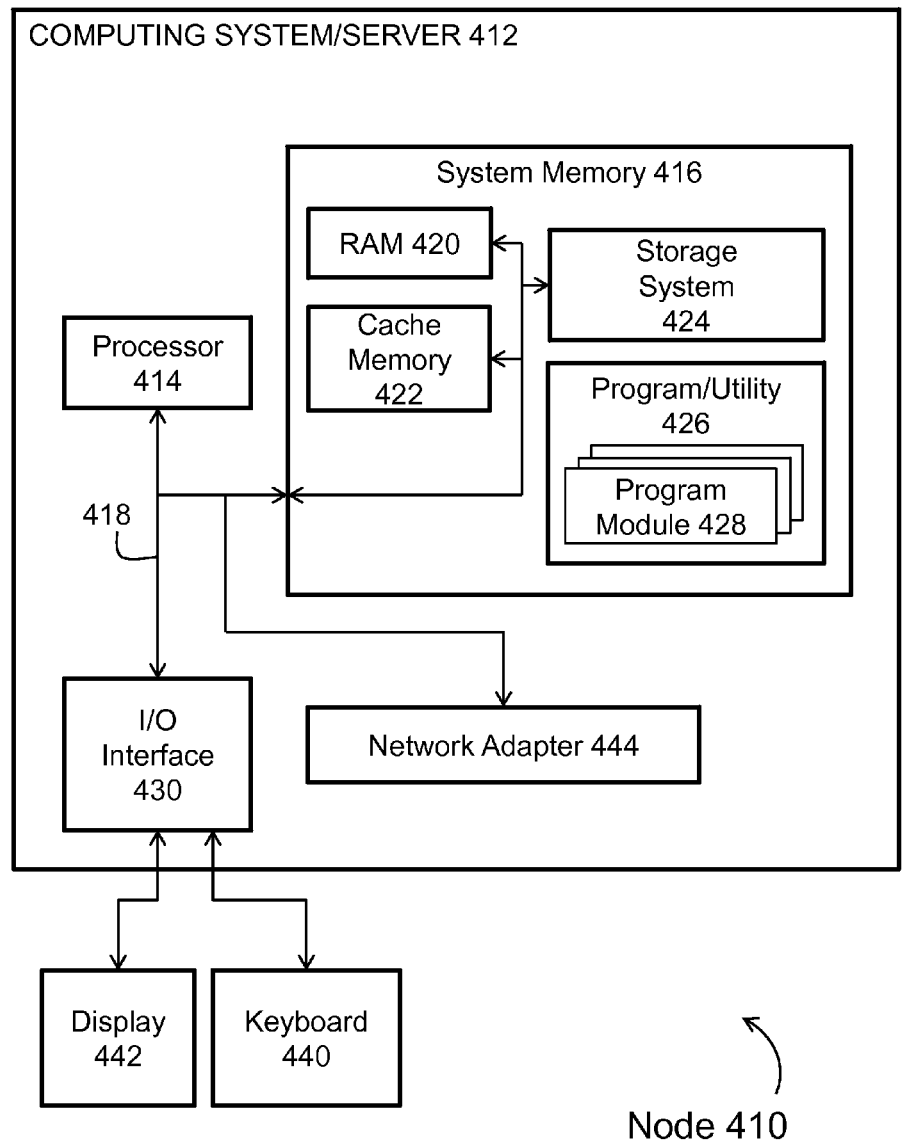
FIG. 4 depicts a cloud computing node according to an embodiment of the present invention.

Referring now to FIG. 4, a schematic of an example of a cloud computing node is shown. A cloud computing node 410 is only one example of a suitable cloud computing node and is not intended to suggest any limitation as to the scope of use or functionality of embodiments of the invention described herein. Regardless, the cloud computing node 410 is capable of being implemented and/or performing any of the functionality set forth hereinabove.

In the cloud computing node 410 there is a computer system/server 412, which is operational with numerous other general purpose or special purpose computing system environments or configurations. Examples of well-known computing systems, environments, and/or configurations that may be suitable for use with the computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 412 may be described in the general context of computer system executable instructions, such as program modules, being executed by a computer system. Generally, program modules may include routines, programs, objects, components, logic, data structures, and so on that perform particular tasks or implement particular abstract data types. The computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system/server 412 in the cloud computing node 410 is shown in the form of a general-purpose computing device. The components of the computer system/server 412 may include, but are not limited to, one or more processors or processing units (e.g., processor 414), a system memory 416, and a bus 418 that couples various system components including the system memory 416 to the processor 414.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer system/server 412 typically includes a variety of computer system readable media. Such media may be any available media that is accessible by the computer system/server 412, and it includes both volatile and non-volatile media, removable and non-removable media.

The system memory 416 can include computer system readable media in the form of volatile memory, such as a random access memory (RAM) 420 and/or a cache memory 422. The computer system/server 412 may further include other removable/non-removable, volatile/non-volatile computer system storage media. By way of example only, a storage system 424 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As will be further depicted and described below, the system memory 416 may include at least one program product having a set (e.g., at least one) of program modules that are configured to carry out the functions of embodiments of the invention.

For example, a program/utility 426, having a set (at least one) of program modules (e.g., a program module 428), may be stored in the system memory 416 by way of example, and not limitation, as well as an operating system, one or more application programs, other program modules, and program data. Each of the operating system, one or more application programs, other program modules, and program data or some combination thereof, may include an implementation of a networking environment. The program modules 426 generally carry out the functions and/or methodologies of embodiments of the invention as described herein.

The computer system/server 412 may also communicate (e.g., via Input/Output (I/O) interfaces, such as I/O interface 430) with one or more external devices, such as a keyboard 440, a pointing device, a display 442, etc.; one or more devices that enable a user to interact with the computer system/server 412; and/or any devices (e.g., network card, modem, etc.) that enable the computer system/server 412 to communicate with one or more other computing devices. Still yet, the computer system/server 412 can communicate with one or more networks such as a local area network (LAN), a general wide area network (WAN), and/or a public network (e.g., the Internet) via a network adapter 444. As depicted, the network adapter 444 communicates with the other components of the computer system/server 412 via the bus 418. It should be understood that although not shown, other hardware and/or software components could be used in conjunction with the computer system/server 412. Examples, include, but are not limited to: microcode, device drivers, redundant processing units, external disk drive arrays, RAID systems, tape drives, and data archival storage systems, etc.

Figure 5:
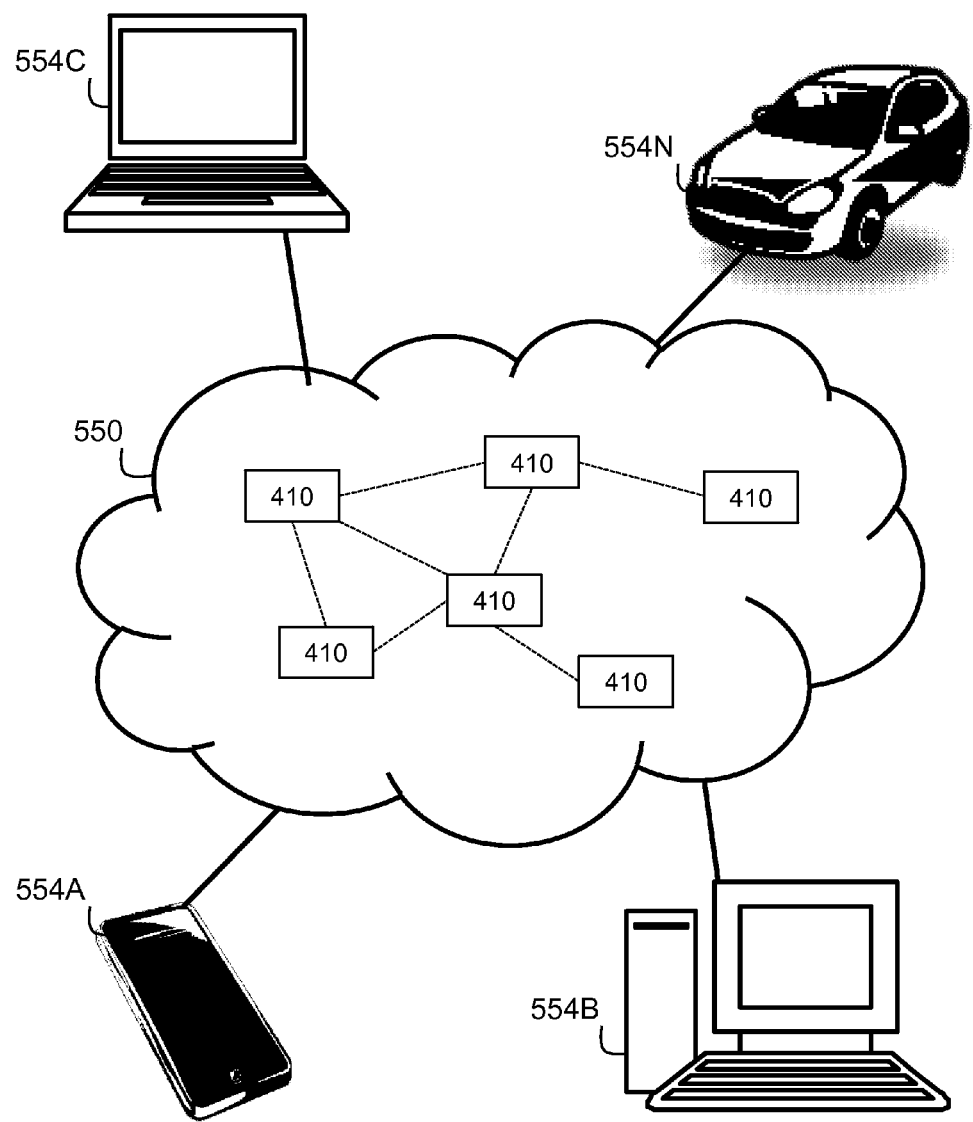
FIG. 5 depicts a cloud computing environment according to an embodiment of the present invention.

Referring now to FIG. 5, illustrative cloud computing environment 550 is depicted. As shown, the cloud computing environment 550 comprises one or more cloud computing nodes 410 with which local computing devices used by cloud consumers, such as, for example, a personal digital assistant (PDA) or cellular telephone 554A, a desktop computer 554B, a laptop computer 554C, and/or an automobile computer system 554N may communicate. The cloud computing nodes 410 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that the computing nodes 410 and cloud computing environment 550 can communicate with any type of computerized device over any type of network and/or network addressable connection (e.g., using a web browser).

Figure 6:
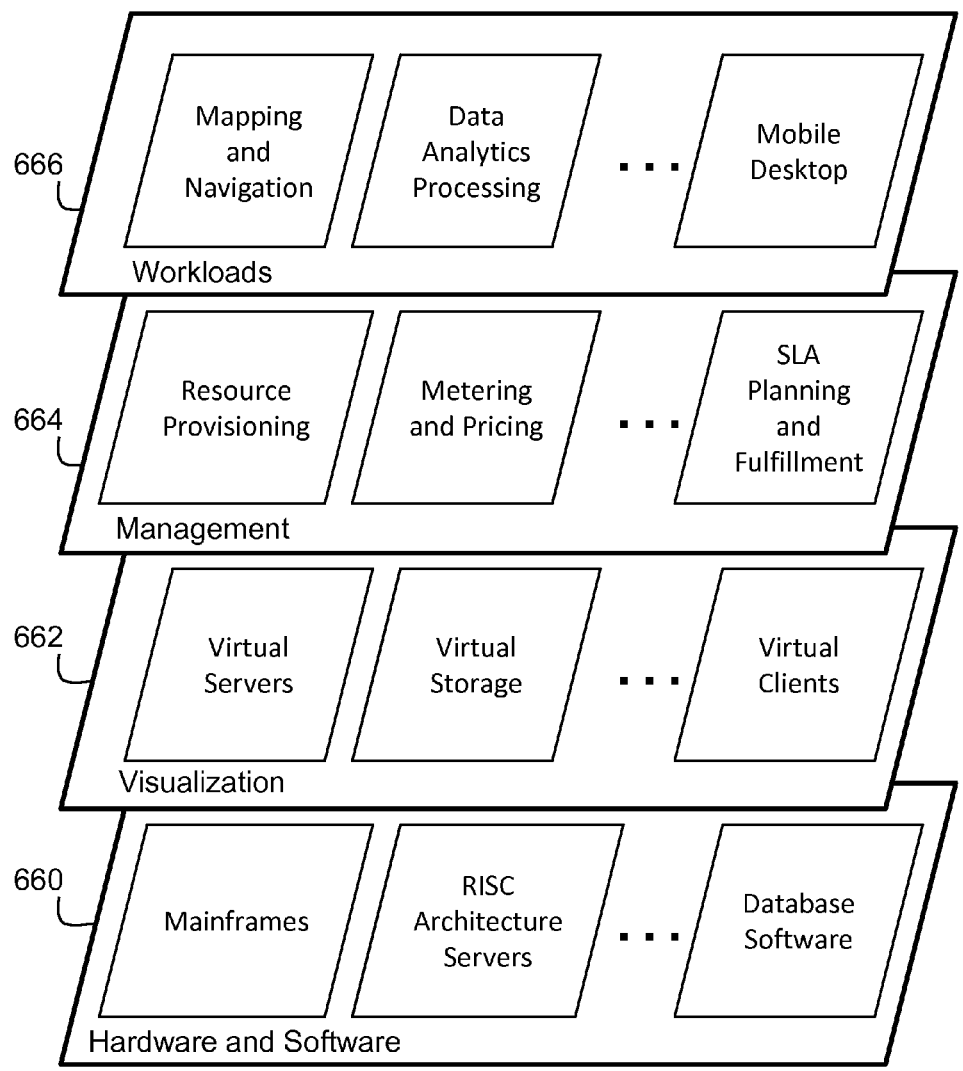
FIG. 6 depicts abstraction model layers according to an embodiment of the present invention.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

A hardware and software layer 660 includes hardware and software components. Examples of hardware components include: mainframes; RISC (Reduced Instruction Set Computer) architecture based servers; storage devices; networks and networking components. In some embodiments, software components include network application server software.

A virtualization layer 662 provides an abstraction layer from which the following examples of virtual entities may be provided: virtual servers; virtual storage; virtual networks, including virtual private networks; virtual applications and operating systems; and virtual clients.

In one example, a management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators.

Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

A workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Technical effects and benefits of embodiments herein include creating virtual files and corresponding request blocks include enabling data manipulation programs to dynamically generate and validate data and thereby circumvent storing input, intermediate, and/or output copies of the data. In this way, the embodiments herein leverage available inexpensive processing power to dynamically generate and validate sets of data (e.g., in real time) to avoid utilization of expensive memory or disk space for large pre-generated sets of data. Note, also, that an amount of inexpensive processing power needed to perform the dynamic generation and validation is extremely lower than an amount of memory or disk space needed for the large pre-generated sets of data, such that on slight more inexpensive processing power is needed to avoid consuming large amount of memory or disk space (which is particularly useful in a virtual test environment or a virtualized container where memory is a premium while processing power available). In turn, since there are no additional disk requirements with respect to the number of concurrently executing tests, embodiments scale up easily as the only additional resources are file descriptors and request blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product, the computer program product comprising a computer readable storage medium having program instructions configured to operate a test program and a data manipulation program embodied therewith, the program instructions readable by a processor coupled to a memory to cause the processor to perform:
    allocating, by the test program, request blocks for input and output data sets;
    allocating, by the test program, input and output files with file names corresponding to the request blocks by generating the file names of the input and output files as direct hashes to a location in the memory that holds the request blocks, the request blocks including instructions describing how to generate or validate data corresponding to the request blocks;
    executing, by the test program, the data manipulation program utilizing the input and output files as parameters by calling the request blocks via the file names to cause the data manipulation program to execute a routine,
    wherein the data manipulation program is a program under test called by the test program,
    wherein the routine is executed by the data manipulation program in accordance with instructions of the request blocks, the data manipulation program utilizing the file names to access the instructions that govern the routine; and
    verifying, by the test program, an output data set of the data manipulation program to provide a logical link between the input and output data set.

2. The computer program product of claim 1, wherein the routine dynamically generates or validates the data corresponding to the request blocks.

3. The computer program product of claim 1, wherein, with respect to the executing of the routine by the data manipulation program, the program instructions further cause the processor to perform:
    receiving, by the routine, the file names as an input;
    hashing, by the routine, the input to derive the locations in the memory of the request blocks;
    reading, by the routine, the instruction of the request blocks from the locations in the memory; and
    dynamically generating or validating, by the routine, the data corresponding to the request blocks.

4. The computer program product of claim 1, wherein the file is an input file and the routine is an input file read routine.

5. The computer program product of claim 1, wherein the file is an output file and the routine is an output file write routine.

6. The computer program product of claim 1, wherein the system is a virtualized container with limited storage on the memory.

7. A system, comprising:
    a memory having computer readable instructions; and
    a processor for executing the computer readable instructions configured to operate a test program and a data manipulation program, the computer readable instructions causing the processor to perform:
    allocating, by the test program, request blocks for input and output data sets;
    allocating, by the test program, input and output files with file names corresponding to the request blocks by generating the file names of the input and output files as direct hashes to a location in the memory that holds the request blocks, the request blocks including instructions describing how to generate or validate data corresponding to the request blocks;
    executing, by the test program, the data manipulation program utilizing the input and output files as parameters by calling the request blocks via the file names to cause the data manipulation program to execute a routine,
    wherein the data manipulation program is a program under test called by the test program upon receipt of the name;
    wherein the routine is executed by the data manipulation program in accordance with instructions of the request blocks, the data manipulation program utilizing the file names to access the instructions that govern the routine; and verifying, by the test program, an output data set of the data manipulation program to provide a logical link between the input and output data set.

8. The system of claim 7, wherein the routine dynamically generates or validates the data corresponding to the request blocks.

9. The system of claim 7, wherein, with respect to the executing of the routine by the data manipulation program, the computer readable instructions further cause the processor to perform:

receiving, by the routine, the file names as an input;

hashing, by the routine, the input to derive the locations in the memory of the request block;

reading, by the routine, the instruction of the request blocks from the locations in the memory; and dynamically generating or validating, by the routine, the data corresponding to the request blocks.

10. The system of claim 7, wherein the file is an input file and the routine is an input file read routine.

11. The system of claim 7, wherein the file is an output file and the routine is an output file write routine.

12. The system of claim 7, wherein the system is a virtualized container with limited storage on the memory.

13. The computer program product of claim 1, wherein the executing of the data manipulation program utilizing the input and output files as the parameters by calling the request blocks via the file names procures how to generate or validate the data corresponding to the request blocks without modifying to the data manipulation program.

\* \* \* \* \*